United States Patent Office 3,338,918

Patented Aug. 29, 1967

1

3,338,918

WATER SOLUBLE PHTHALOCYANINE DYES AND METHOD FOR MAKING SAME

Gordon A. Geselbracht and Wilson J. Bryan, Jr., Charlotte, N.C., assignors to Martin-Marietta Corporation, a corporation of Maryland No Drawing. Filed Dec. 20, 1965, Ser. No. 515,172
4 Claims. (Cl. 260—314.5)

ABSTRACT OF THE DISCLOSURE

There is disclosed herein water soluble phthalocyanine dyes of the formula

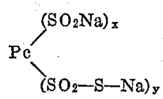

and method for making same comprising the step of reducing $Pc(SO_2Cl)_n$ in aqueous medium at pH 4–10 with an excess of NaSH or $Na_2S$, wherein Pc is the radical of phthalocyanine, $x$ is a number from 1.2–2.3, $y$ is a number from 0.8–2.3, $n$ is a number from 2–4, and $x+y=n$. Use of the products for making wet-fast green dyeings on cotton is also disclosed.

The present invention relates to dyes, and more particularly to water soluble phthalocyanine dyes and to the method for making same.

The water soluble phthalocyanine dyes of the present invention are particularly characterized in having the formula

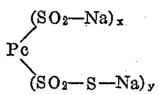

wherein Pc is the radical of phthalocyanine, copper phthalocyanine or nickel phthalocyanine; $x$ is a number from 1.2–2.3; $y$ is a number from 0.8–2.3; and $x+y$ is a number from 2–4.

The method of the present invention is particularly characterized in that it is a method for making a water soluble phthalocyanine dye of the formula

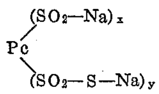

comprising the step of reducing $Pc(SO_2Cl)_n$ in aqueous medium at pH 4–10 with an excess of NaSH or $Na_2S$, wherein Pc is the radical of phthalocyanine, copper phthalocyanine or nickel phthalocyanine; $x$ is a number from 1.2–2.3; $y$ is a number from 0.8–2.3; $n$ is a number from 2–4; and $x+y=n$.

The dyes of the present invention may be used for making wet-fast green dyeings on cotton.

British patent specification 960,643, published June 10, 1964, discloses that when phthalocyanines having more than one sulphonyl chloride group are treated with sodium bisulfite or sodium sulfite that only one of the sulfonyl chloride groups is reduced to a sulfinic acid group and that the remaining sulfonyl chloride groups are simultaneously hydrolyzed to sulfonic acid groups. According to the British patent, phthalocyanines containing more than one sulfinic acid group per molecule may be prepared by treating phthalocyanines having more than one sulfonyl chloride group with hydrazine in alkaline medium.

The primary difficulties with the above hydrazine method are that hydrazine is relatively expensive, vapor explosive, toxic, and especially dangerous to the eyes.

2

The above difficulties are overcome by the method of the present invention by means of which phthalocyanine dyes having an average of more than one pendant sulfinate group ($—SO_2Na$) may be produced through use of NaSH or $Na_2S$, in a safe and economical manner.

Inasmuch as sodium sulfite or sodium bisulfite convert only one sulfonyl chloride group of a phthalocyanine polysulfonyl chloride to sulfinic acid and hydrolyze the remainder to sulfonic acid groups, it is surprising that $Na_2S$ or NaSH reacted upon phthalocyanine polysulfonyl chlorides produces more than one sulfinate group and in addition pendant thiolsulfonate groups ($SO_2—S—Na$).

The following is a more detailed description of the present invention.

The starting material is a phthalocyanine polysulfonyl chloride of the formula $Pc(SO_2Cl)_n$, wherein Pc is the radical of phthalocyanine, copper phthalocyanine or nickel phthalocyanine, and $n$ is a number from 2–4. Such compounds, are well known, see for example British patent specification 960,643 and the patents cited therein.

The $Pc(SO_2Cl)_n$ is stirred with ice and water so that the temperature is about 0°–5° C., and preferably about 0° C. A small amount of anti-foaming agent, such as tributyl phosphate or tributoxyethyl phosphate may be advantageously added.

The pH of the aqueous $Pc(SO_2Cl)_n$ composition is quite acid, and should be elevated to pH 4–10, and preferably to about pH 7 with an alkali such as NaOH.

An excess of NaSH or $Na_2S$, preferably as an aqueous solution at room temperature, is then added to the cold $Pc(SO_2Cl)_n$. By excess we means that more $Na_2S$ or NaSH is used than the theoretical amount required to complete the reaction. A suitable range would be about $1.05n$–$1.5n$ moles $Na_2S$ or NaSH for each mole of $Pc(SO_2Cl)_n$.

The mass is stirred 12–15 hours, while permitting it to warm to room temperature naturally. During addition of the $Na_2S$ or NaSH, the pH drops to 4–7, but during the course of the reaction rises to pH 8–10. Acid or alkali, such as HCl or NaOH, may be added to maintain the reacting mixture within the range of pH 4–10, and preferably about pH 7. Reaction is substantially complete within about 30 minutes after adding the $Na_2S$ or NaSH, but the mass is stirred 12–15 hours to insure completion of reaction.

A concentrated aqueous solution of the water soluble phthalocyanine dye results, which may be marketed as a concentrated water soluble dye solution.

The following is an example of using the concentrated dye solution for dyeing. The concentrated dye solution is diluted with water, and urea and thiourea are added thereto, so that a dye pad-liquor containing 2.5% of the dye, calculated as solids, 5% thiourea, and 10% urea results. The dye liquor is padded onto cotton fabric, the fabric squeezed to 60% wet pick-up, based on fabric weight, dried, and subjected to hot air at 400° F. for 1 minute to fix the dye. All parts are by weight, unless otherwise specified.

If desired, instead of marketing the phthalocyanine dye as a concentrated dye solution, the concentrated dye solution may be evaporated to dryness to produce the sodium salt solids of the dye, which solids are water soluble and may be applied to cotton by the above method.

Also, if desired, the acid solids form of the dye may be recovered by filtering the concentrated dye solution to remove any impurities, adding 10%–20% NaCl, acidifying to pH 1–3 with a mineral acid to precipitate the dye, and collecting the acid form precipitate. The acid form of the dye is soluble in aqueous $Na_2S$ or alkali, and may be applied to cotton by the above described method.

The following are illustrative examples, in which all parts are by weight unless otherwise specified.

*Example 1*

An aqueous solution of a water soluble dye of the formula

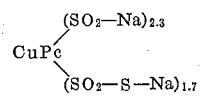

wherein CuPc is the radical of copper phthalocyanine, may be prepared as follows.

97 gms. copper phthalocyanine tetra-(4)-sulfonyl chloride are stirred with ice and water to 600 ml. volume at 0° C., and optionally three drops of tributyl phosphate anti-foaming agent are added. The pH is adjusted to 5 by adding 15% aqueous NaOH at room temperature to the cold mass. 69.1 gms. 60% $Na_2S$, dissolved in 300 ml. water at room temperature, and enough ice to maintain the mass at 0° C. during addition of the $Na_2S$ are added, and the mass is stirred 12–15 hours while permitting it to warm to room temperature naturally. An aqueous solution of the copper phthalocyanine dye results.

*Example 2*

An aqueous solution of a water soluble dye of the formula

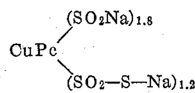

wherein CuPc is the radical of copper phthalocyanine, may be prepared as follows.

87.15 gms. copper phthalocyanine tri-(3) - sulfonyl chloride are stirred with ice and water to 900 ml. volume at 0° C., and optionally three drops of tributyl phosphate anti-foaming agent are added. The pH is adjusted to 7 by adding 15% aqueous NaOH at room temperature to the cold mass. 51.9 gms. of 43% aqueous NaSH solution at room temperature are added to the cold mass, and the mass is stirred 12–15 hours while being permitted to warm to room temperature naturally. An aqueous solution of the copper phthalocyanine dye results.

*Example 3*

An aqueous solution of a water soluble dye of the formula

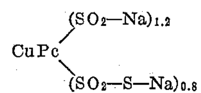

wherein CuPc is the radical of copper phthalocyanine, may be prepared as follows.

77.3 gms. copper phthalocyanine di-(4)-sulfonyl chloride are stirred with ice and water to 700 ml. volume at 0° C., and optionally three drops tributyl phosphate anti-foaming agent are added. The pH is adjusted to 5 with 15% aqueous NaOH, and 34.6 gms. 60% $Na_2S$, dissolved in 150 ml. water at room temperature, and enough ice to maintain the mass at 0° C. during addition of the $Na_2S$ are added. The mass is stirred 12–15 hours while permitting it to warm to room temperature naturally. An aqueous solution of the copper phthalocyanine dye results.

*Example 4*

An aqueous solution of a water soluble dye of the formula

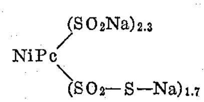

wherein NiPc is the radical of nickel phthalocyanine, may be prepared as follows.

This example is the same as Example 1 above, except that 96.5 gms. nickel phthalocyanine tetra-(3)-sulfonyl chloride are substituted for the copper phthalocyanine tetra-(4)-sulfonyl chloride used in Example 1.

*Example 5*

An aqueous solution of a water soluble dye of the formula

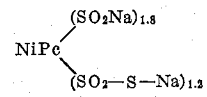

wherein NiPc is the radical of nickel phthalocyanine, may be prepared as follows.

This example is the same as Example 2 above except that 86.7 gms. nickel phthalocyanine tri-(4)-sulfonyl chloride are substituted for the copper phthalocyanine tri-(3)-sulfonyl chloride used in Example 2. An aqueous solution of the nickel phthalocyanine dye results.

*Example 6*

An aqueous solution of a water soluble dye of the formula

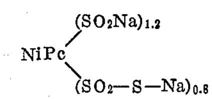

wherein NiPc is the radical of nickel phthalocyanine, may be prepared as follows.

This example is the same as Example 3 above except that 76.8 gms. nickel phthalocyanine di-(4)-sulfonyl chloride are substituted for the copper phthalocyanine di-(4)-sulfonyl chloride used in Example 3. An aqueous solution of the nickel phthalocyanine dye results.

*Example 7*

An aqueous solution of a water soluble dye of the formula

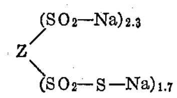

wherein Z is the radical of phthalocyanine, may be prepared as follows.

This example is the same as Example 2 above, except that 90.65 gms. of phthalocyanine tetra-(4)-sulfonyl chloride are substituted for the copper phthalocyanine tri-(3)-sulfonyl chloride used in Example 2, and except that the amount of 43% aqueous NaSH solution is increased from 51.9 gms. to 69.1 gms. An aqueous solution of the phthalocyanine dye results.

*Example 8*

An aqueous solution of a water soluble dye of the formula

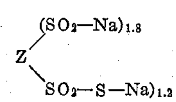

wherein Z is the radical of phthalocyanine, may be prepared as follows.

This example is the same as Example 3 above except that 80.1 gms. phthalocyanine tri-(3)-sulfonyl chloride are substituted for the copper phthalocyanine di-(4)-sulfonyl chloride used in Example 3, and except that the amount of 60% $Na_2S$ used is increased from 34.6 gms. to 51.9 gms. An aqueous solution of the phthalocyanine dye results.

*Example 9*

An aqueous solution of a water soluble phthalocyanine dye of the formula

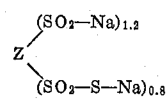

wherein Z is the radical of phthalocyanine, may be prepared as follows.

This example is the same as Example 2 above except that 71.15 gms. phthalocyanine di-(3)-sulfonyl chloride are substituted for the copper phthalocyanine tri-(3)-sulfonyl chloride used in Example 2, and except that the amount of 43% aqueous NaSH used is reduced from 51.9 gms. to 34.6 gms. An aqueous solution of the phthalocyanine dye results.

*Example 10*

An aqueous solution of a water soluble dye of the formula

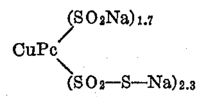

wherein CuPc is the radical of copper phthalocyanine, may be prepared as follows.

97 gms. copper phthalocyanine tetra-(3)-sulfonyl chloride are slurried with ice and water to 960 ml. volume at 0° C. The pH is adjusted to 7 by adding 15% aqueous NaOH at room temperature to the cold mass, and optionally 3 drops of tributyl phosphate anti-foaming agent are added. 77.9 gms. 43% aqueous NaSH solution at room temperature are added to the mass. The mass is stirred for 12–15 hours while being permitted to warm to room temperature naturally. An aqueous solution of the phthalocyanine dye results.

What is claimed is:

1. A water soluble phthalocyanine dye of the formula

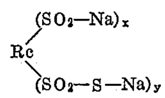

wherein Pc is the radical of phthalocyanine, copper phthalocyanine or nickel phthalocyanine; $x$ is a number from 1.2–2.3; $y$ is a number from 0.8–1.7; and $x+y$ is a number from 2–4.

2. A water soluble phthalocyanine dye as defined in claim 1, and further characterized in that Pc is the radical of copper phthalocyanine; $x$ is 1.7; and $y$ is 2.3.

3. A method for making a water soluble phthalocyanine dye of the formula

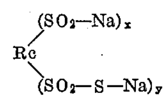

comprising the steps of adding an excess of NaSH or $Na_2S$ to $Pc(SO_2Cl)_n$ in aqueous medium at 0°–5° C. and pH 4–10, and stirring the resulting mass 12–15 hours while permitting it to warm to room temperature, wherein Pc is the radical of phthalocyanine, copper phthalocyanine or nickel phthalocyanine; $x$ is a number from 1.2–2.3; $y$ is a number from 0.8–2.3; $n$ is a number from 2–4; and $x+y=n$.

4. A method as defined in claim 3, and further characterized in the $Pc(SO_2Cl)_n$ is copper phthalocyanine tetra-(3)-sulfonyl chloride; said pH is 7; $x$ is 1.7; $y$ is 2.3; and in which 6 gram molecular weights of NaSH are used for each gram molecular weight of copper phthalocyanine tetra-(3)-sulfonyl chloride used.

No reference cited.

WALTER A. MODANCE, *Primary Examiner.*

H. I. MOATZ, *Assistant Examiner.*

UNITED STATES PATENT OFFICE
CERTIFICATE OF CORRECTION

Patent No. 3,338,918 August 29,1967

Gordon A. Geselbracht et al.

It is hereby certified that error appears in the above numbered patent requiring correction and that the said Letters Patent should read as corrected below.

Column 5, lines 31 to 35, and column 6, lines 11 to 14, for that portion of the formulas reading --"Rc" , each occurrence, read -- Pc --.

Signed and sealed this 13th day of August 1968.

(SEAL)
Attest:

Edward M. Fletcher, Jr.
Attesting Officer

EDWARD J. BRENNER
Commissioner of Patents